(12) United States Patent
Ku et al.

(10) Patent No.: US 6,657,932 B1
(45) Date of Patent: Dec. 2, 2003

(54) DEVICE AND METHOD OF TEMPERATURE CONTROL FOR OPTICAL STORAGE AND RETRIEVING APPARATUS

(75) Inventors: Cheng-Chieh Ku, Taitung (TW); Meng-Shin Yen, Taipei (TW)

(73) Assignee: Acer Communications & Multimedia Inc., Taoyuan (TW)

( * ) Notice: Subject to any disclaimer, the term of this patent is extended or adjusted under 35 U.S.C. 154(b) by 416 days.

(21) Appl. No.: 09/721,981

(22) Filed: Nov. 27, 2000

(30) Foreign Application Priority Data

Feb. 1, 2000 (TW) ........................................ 89101717 A

(51) Int. Cl.⁷ ................................................ G11B 7/00
(52) U.S. Cl. ................................ 369/44.29; 369/44.35; 369/53.18
(58) Field of Search .......................... 369/53.13, 53.18, 369/53.2, 53.26, 53.35, 53.24, 47.44, 44.32, 44.29, 44.35, 44.36, 44.28; 360/69

(56) References Cited

U.S. PATENT DOCUMENTS

| | | | |
|---|---|---|---|
| 5,566,077 A | * 10/1996 | Kulakowski et al. | .... 369/53.42 |
| 5,764,430 A | * 6/1998 | Ottesen et al. | ........... 360/73.03 |
| 5,852,596 A | * 12/1998 | Kurita et al. | ............. 369/53.18 |
| 6,088,662 A | * 7/2000 | Flinsbaugh et al. | ............ 360/27 |
| 6,222,802 B1 | 4/2001 | Ma | |
| 6,229,275 B1 | * 5/2001 | Yamamoto | ................ 369/44.35 |
| 6,301,207 B1 | * 10/2001 | Isokawa et al. | .......... 369/53.45 |

FOREIGN PATENT DOCUMENTS

| | | |
|---|---|---|
| CN | 1201234 A | 12/1998 |
| EP | 0 432 863 A2 | 6/1991 |
| JP | 04214235 A | * 8/1992 |

OTHER PUBLICATIONS

"OP Amplifier Figure" cited by Taiwanese Patent Office.

* cited by examiner

Primary Examiner—Thang V. Tran
(74) Attorney, Agent, or Firm—Arent Fox Kintner Plotkin & Kahn, PLLC

(57) ABSTRACT

The present invention relates to a device and a method of temperature control for an optical storage and retrieving apparatus. When the internal temperature of the optical storage and retrieving apparatus reaches a predetermined temperature, the temperature control device is able to bid the optical storage and retrieving apparatus steadily retrieve data by lowering the rate of a carry device of the optical storage and retrieving apparatus, or by instructing a servo control device to lower the tracking loop gain, or by lowering the velocity and the braking slope of a data read/write device of the optical storage and retrieving apparatus. The temperature control device includes a sensing device capable of detecting the present temperature of the optical storage and retrieving apparatus so as to generate a first voltage signal; a reference device operatively connected to the sensing device whereby the value of a predetermined temperature is modified and a second voltage signal is generated; a comparison device operatively connected to the sensing device and the reference device respectively whereby a first voltage signal and a second voltage signal is received and thus a compare signal is output. When the CPU receive the compare signal, if the compare signal is greater than a predetermined value, the CPU generate a first control signal to the driving device to bid the driving device lower the rate of the carry device. The CPU is also able to generate a second control signal to the servo control device to bid the servo control device lower the tracking loop gain or lower the velocity and the braking slope of a data read/write device of the optical storage and retrieving apparatus.

11 Claims, 3 Drawing Sheets

DEVICE AND METHOD OF TEMPERATURE CONTROL FOR OPTICAL STORAGE AND RETRIEVING APPARATUS

FIELD OF INVENTION

The present invention relates to a temperature control device and method for an optical storage and retrieving apparatus, and especially a temperature control device and method using a temperature detecting apparatus to control the rate, the tracking loop gain, the velocity and braking slope of the data read/write device of the optical storage and retrieving apparatus for lowering the temperature of the optical storage and retrieving apparatus during operation.

BACKGROUND OF INVENTION

With the substantial increasing of amount of data manipulated by state-of-art computer, the optical storage media such as CD-ROM or MO disk, has been a minimum requirement to a computer system. The optical storage and retrieving apparatuse such as a CD-ROM drive serve as an intermediate device retrieving data stored in the CD-ROM and transferring the data into a computer for further operation.

Referring to FIG. 1, a typical optical storage and retrieving apparatus 10 includes a carry device 11, a data read/write device 12, a guider 13, a servo control device 14, a driving device 15 and a CPU 16. The data read/write device 12 is supported by the guider 13 and receives an actuating signal from a servo control device 14 for commanding the pickup 12 move at a velocity and a braking slope on the guider 13. The carry device 11 carries an optical storage medium 17 and receives a driving signal sent by the driving device 15 to selectively rotate the optical storage medium 17. The servo control device 14 outputs a retrieving signal to the data read/write device 12 and the data read/write device 12 emits an incident light signal to the optical storage medium 17. The incident light signal is reflected by the optical storage medium 17 as a reflecting light signal. The reflecting light signal is received by the data read/write device 12 and then the data read/write device 12 outputs a corresponding voltage signal to the servo control device 14. The servo control device 14 then amplifies the voltage signal with a tracking loop gain to generate a tracking signal. Using the tracking signal, the servo control device 14 controls the incident light signal of the data read/write device 12 to closely track the data track on the optical storage medium 17. The CPU 16 is operatively connected to the servo control device 14 and the driving device 15 in order to command and control the servo control device 14 and the driving device 15 such that the contents recorded in the optical storage medium 17 are correctly and uninterruptedly retrieved.

However, in order to accommodate a large amount of multi-media data transfer required by a user, the optical storage and retrieving apparatus 10 has to retrieve the recorded contents in the optical storage medium 17 at a high speed. Therefore the earlier 2x CD-ROM has lost its market and a 40x or higher CD-ROM dominates in the market. A higher speed of CD-ROM implies a higher rotation rate of the carry device 11 and a higher velocity of the data read/write device 12 moving on the guider 13. Nevertheless, the carry device 11 and the data read/write device 12 tends to generate heat under high rate operation and further to elevate the internal temperature of the CD-ROM. Most notable of all, in order to match up with the fast operation of the carry device 11 and the data read/write device 12, the servo control device 14 and the driving device 15 also have to work at a higher frequency. ICs in the servo control device 14 and the driving device 15 therefore generates more heat due to high frequency operation and again results in the elevation of internal temperature of the optical storage and retrieving apparatus 10.

Other than the problem resulting from high-speed operation of the CD-ROM stated above, as the CD-ROM operates in an environment of higher temperature, the internal temperature of the CD-ROM rises with ambient temperature. All circumstances of the internal temperature being elevated often lead to an unstable operation condition of the CD-ROM while retrieving the contents of the optical storage medium 17. The unstable situations are directly and mainly due to the severe variation of working characteristics of many ICs in the servo control device 14. As the temperature is elevated to a certain degree, the operation characteristics of driving device 15 and the pickup of the data read/write device 12 vary substantially. Therefore, the focusing, tracking and seeking operations of the CD-ROM are unstable. The read/write ability of the CD-ROM is deteriorated. While the un-expected condition happens, one could only lower the control parameters, including the rate of the carry device 11, the value of the tracking loop gain, the velocity and the braking slope of the data read/write device 12, to recover the read/write ability of the CD-ROM.

To lower the temperature, the conventional approach is to improve the efficiency of heat dissipation by using heat dissipation fin having a larger surface or to improve the ventilation by increasing the number of ventilation holes or by re-arranging the relative position of each components in the CD-ROM. However, this type of approach can only solve the issue of heat generation due to high frequency operation of the ICs and can not effectively and totally solve the issue of heat generation resulting from CD-ROM's operating in a high-temperature environment or operating at high speed.

SUMMARY OF INVENTION

The present invention provides a temperature control device situated within the optical storage and retrieving apparatus. When the internal temperature of the optical storage and retrieving apparatus reaches a predetermined value, the temperature control device causes the associated control parameters operating the optical storage and retrieving apparatus to be lower such that the optical storage and retrieving apparatus retrieves data accurately.

Another object of the present invention is to provide a temperature control method for an optical storage and retrieving apparatus. The method, based on the internal temperature value of the CD-ROM, is able to lower the rate of the carry device in the optical storage and retrieving apparatus, and/or to lower the tracking loop gain of the servo control device, and/or to lower the velocity and braking slope of the data read/write device so as to command the optical storage and retrieving apparatus retrieve data accurately.

To further elaborate the way, the structure and the characteristics of the present invention, the following preferred embodiments are illustrated accompanied with the attached figures. While what are stated below are only preferred embodiments of the present invention, it is to be understood that the present invention is not limited by the preferred embodiments. The claims of the invention shall cover all equivalent or variations and modifications according to the spirit of the invention.

DETAILED DESCRIPTION OF THE PREFERRED EMBODIMENTS

Figure 1:
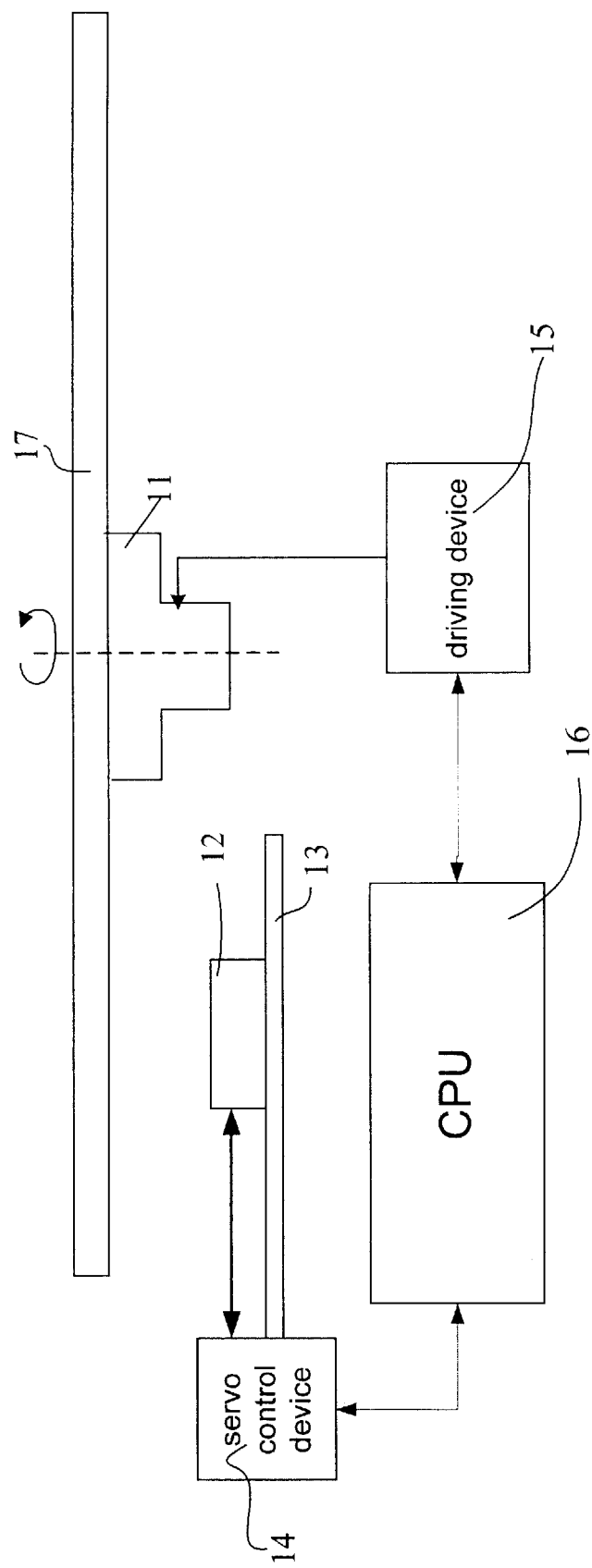
FIG. 1 shows a block diagram of a traditional optical storage and retrieving apparatus.
Figure 2:
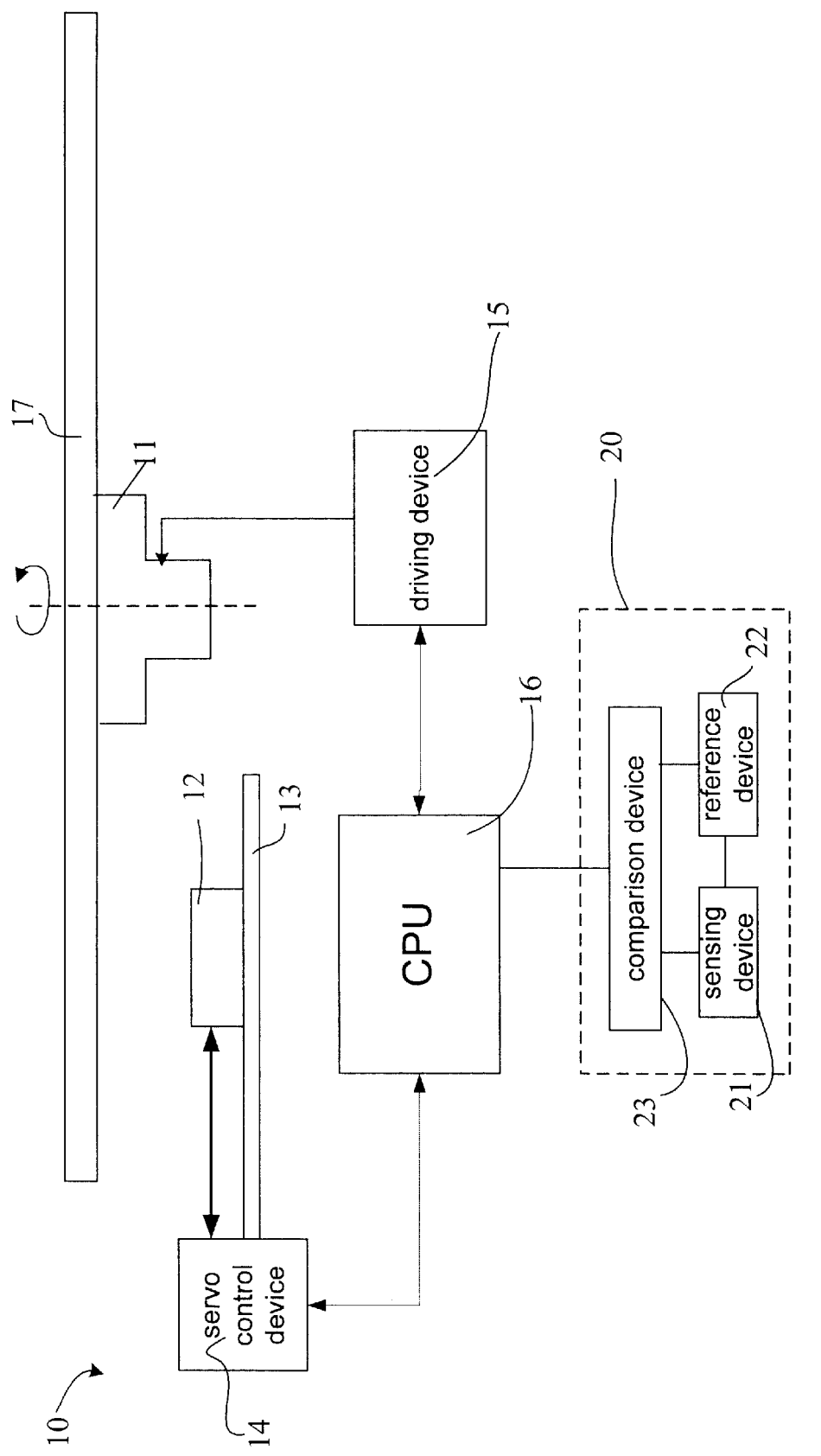
FIG. 2 shows an optical storage and retrieving apparatus and a temperature control device thereof according to the present invention.

Referring to FIG. 2, the servo control device 14 of the optical storage and retrieving apparatus 10 of the invention stores a tracking loop gain and the servo control device 14 controls a velocity and a braking slope at which the data read/write device 12 moving on the guider 13. The driving device 15 controls the rotation rate of the carry device 11. The temperature control device 20 of the optical storage and retrieving apparatus 10 includes a sensing device 21, a reference device 22 and a comparison device 23. The sensing device 21 detects the current temperature of the optical storage and retrieving apparatus 10 to generate a voltage signal. The reference device 22 and the sensing device 21 are operatively connected to each other to adjust a predetermined temperature value and generate a reference signal according to the predetermined temperature value. The comparison device 23 generates a compare signal by operatively connecting to the sensing device 21 and the reference device 22 respectively to receive the voltage signal and the reference signal. The CPU 16 determines whether the temperature is too high in accordance with the compare signal received. As the CPU 16 determines that the temperature is greater than the predetermined temperature, it generates a first control signal to the driving device 15 to command the driving device 15 lower the rotation rate of the carry device 11, and/or generates a second control signal to the servo control device 14 to command the servo control device 14 to lower the tracking loop gain, and/or to lower the velocity and the braking slope of the data read/write device 12.

In other words, when the actual temperature of the optical storage and retrieving apparatus 10 changes, the sensing device 21 detects the actual temperature change and generates a corresponding voltage signal. The reference device 22 is used to set the predetermined temperature value and to generate the reference signal. The comparison device 23 compares the voltage signal and the reference signal and sends the compare signal to the CPU 16 based on the result of the comparison. The CPU 16 determines whether the actual temperature of the optical storage and retrieving apparatus 10 is greater than the predetermined temperature. If it is not, the carry device 11 of the optical storage and retrieving apparatus 10 operates at a first predetermined value for the rotation rate, and the data read/write device 12 moving on the guider 13 operates at a second and a third predetermined value for the velocity and the braking slope respectively. At the same time, the tracking loop gain of the servo control device 14 is tuned at a fourth predetermined value. On the contrary, if it is higher, the CPU 16 generates the first control signal to the driving device 15. The driving device 15 lowers the rotation rate of the carry device 11 in response. The CPU 16 also generates the second control signal to the servo control device 14 and the servo control device 14 lowers the tracking loop gain and/or the velocity and the braking slope of the data read/write device 12 in response.//(part2)

Figure 3:
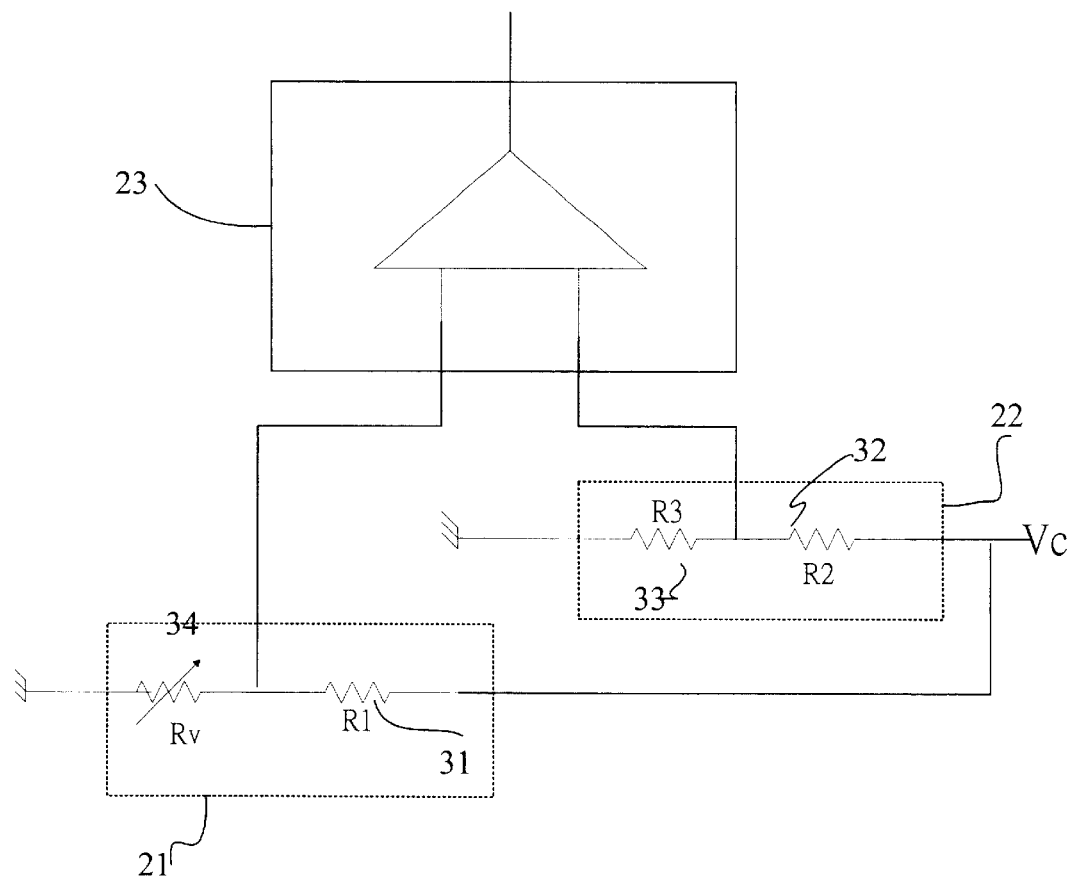
FIG. 3 shows an embodiment of the temperature control device in the present invention.

A preferred embodiment of the temperature control device 20 of the invention is shown in FIG. 3. The sensing device 21 includes a thermistor 34 with resistivity equal to Rv and a first resistor 31 with resistivity equal to R1. The resistivity Rv varies with the temperature. The reference device 22 includes a second resistor 32 with resistivity equal to R2 and a third resistor 33 with resistivity equal to R3. One could select different values for R1, R2 and R3 as needed. When connected to a power source of Vc, the sensing device 21 outputs a first voltage signal Vc*Rv/(R1+Rv). Since the resistivity Rv of the thermistor 34 would varies with the temperature, the first voltage signal varies due to temperature change. The reference signal output by the reference device 22 is Vc*R3/(R2+R3). The value of the reference signal, which is not changed with the temperature, could be changed by varying R2 and R3 values. The comparison device 23 includes a comparator outputting a compare signal to the CPU based on the difference of the first voltage signal and the reference signal. Provided that the compare signal is greater than a predetermined value pre-set within the CPU 16 representative of the temperature of the optical storage and retrieving apparatus 10 being greater than the predetermined temperature, the CPU 16 respectively generates a first control signal and a second control signal to the driving device 15 and the servo control device 14. The driving device 15, in response, lowers the rotation rate of the carry device 11. The servo control device 14, in response, lowers the tracking loop gain, and the velocity and the braking slope of the data read/write device 12.

Moreover, the present invention provides a temperature control method for an optical storage and retrieving apparatus, the temperature control method includes the following steps.

(1) detect whether the temperature of the optical storage and retrieving apparatus 10 is greater than a predetermined value.

(2) if the temperature is greater than said predetermined value in step (1), then lower the value of a control parameter.

(3) repeatedly perform steps (1) to (2), until the optical storage and retrieving apparatus ceases to retrieve data.

However, if the temperature of the optical storage and retrieving apparatus 10 is not greater than the predetermined value, then (1) set the rate of the carry device 11 to be a first predetermined value; (2) set the velocity of the data read/write device 12 to be a second predetermined value and the braking slope to be a third predetermined value; (3) set the tracking loop gain of the servo control device 14 to be a fourth predetermined value.

The control parameter may be the rate of the carry device 11, the tracking loop gain of the servo control device 14 or the velocity and the braking slope at which the data read/write device 12 moving on the guider 13.

In summary, when the internal temperature of the optical storage and retrieving apparatus 10 reaches a predetermined value, the temperature control device 20 of the present invention lowers the rate of the carry device 11 or lowers the tracking loop gain, and/or the velocity and the braking slope of the data read/write device 12. Through this arrangement, the optical storage and retrieving apparatus 10 can retrieve data accurately and therefore the read/write quality of the optical storage and retrieving apparatus 10 is enhanced to prevent the unstable focusing, tracking and seeking of the CD-ROM due to high temperature.

We claim:

1. An optical storage and retrieving apparatus, comprising:
   a carry means for carrying and selectively rotating an optical storage medium;
   a driving means for controlling said carry means operating at a rate;

a data read/write means for emitting an incident light signal to said optical storage medium and receiving a reflecting light signal reflected from said optical storage medium;

a guider for supporting said data read/write means to move thereon;

a servo control means for controlling a velocity and a braking slope of said data read/write means moving along said guider, said servo control means storing a tracking loop gain;

a central processing unit (CPU) being operatively connected to said servo control means and said driving means respectively as to control said servo control means and said driving means, so that the recorded contents of said optical storage medium are retrieved;

a temperature control means, responsive to a temperature of the optical storage and retrieving apparatus, for generating a compare signal; and whereby said central processing unit, responsive to said compare signal being greater than a predetermined value, lowers said velocity.

2. The optical storage and retrieving apparatus of claim 1, wherein said central processing unit outputs a third control signal to said servo control means such that said velocity is varied by said servo control means.

3. A temperature control method for an optical storage and retrieving apparatus, said optical storage and retrieving apparatus comprising a carry means selectively rotating at a rate, a servo control means, a guider, a data read/write means moving on said guider at a velocity and a braking slope, said servo control means storing a tracking loop gain, the method comprising the following steps:

(1) detecting whether a temperature of said optical storage and retrieving apparatus is greater than a predetermined value;

(2) if the temperature is greater than said predetermined value in step (1), then: lowering value of parameter said velocity; and (3) repeatedly performing steps (1) to (2), until said optical storage and retrieving apparatus ceases to retrieve data.

4. An optical storage and retrieving apparatus, comprising:

a carry means for carrying and selectively rotating an optical storage medium;

a driving means for controlling said carry means operating at a rate;

a data read/write means for emitting an incident light signal to said optical storage medium and receiving a reflecting light signal reflected from said optical storage medium;

a guider for supporting said data read/write means to move thereon;

a servo control means for controlling a velocity and a braking slope of said data read/write means moving along said guider, said servo control means storing a tracking loop gain;

a central processing unit (CPU) being operatively connected to said servo control means and said driving means respectively as to control said servo control means and said driving means, so that the recorded contents of said optical storage medium are retrieved;

a temperature control means, responsive to a temperature of the optical storage and retrieving apparatus, for generating a compare signal; and whereby said central processing unit, responsive to said compare signal being greater than a predetermined value, lowers said braking slope.

5. The optical storage and retrieving apparatus of claim 4, wherein said central processing unit outputs a fourth control signal to said servo control means such that said braking slope is varied by said servo control means.

6. An optical storage and retrieving apparatus, comprising:

a carry means for carrying and selectively rotating an optical storage medium;

a driving means for controlling said carry means operating at a rate;

a data read/write means for emitting an incident light signal to said optical storage medium and receiving a reflecting light signal reflected from said optical storage medium;

a guider for supporting said data read/write means to move thereon;

a servo control means for controlling a velocity and a braking slope of said data read/write means moving along said guider, said servo control means storing a tracking loop gain;

a central processing unit (CPU) being operatively connected to said servo control means and said driving means respectively as to control said servo control means and said driving means, so that the recorded contents of said optical storage medium are retrieved; and a temperature control means, responsive to a temperature of the optical storage and retrieving apparatus, for generating a compare signal, said temperature control means comprising:

a sensing means for detecting said temperature so as to generate a voltage signal;

a reference means, being operatively connected to said sensing means, for generating a reference signal; and a comparison means, being operatively respectively connected to said sensing means and said reference means, for outputting said compare signal by comparing said voltage signal and said reference signal;

whereby said central processing unit, responsive to said compare signal being greater than a predetermined value, lowers said velocity.

7. The optical storage and retrieving apparatus of claim 6, wherein said sensing means comprises a thermistor and a first resistor connected in series.

8. The optical storage and retrieving apparatus of claim 6, wherein said reference means comprises a second resistor and a third resistor connected in series.

9. The optical storage and retrieving apparatus of claim 6, wherein said comparison means includes a comparator.

10. A temperature control method for an optical storage and retrieving apparatus, said optical storage and retrieving apparatus comprising a carry means selectively rotating at a rate, a servo control means, a guider, a data read/write means moving on said guider at a velocity and a braking slope, said servo control means storing a tracking loop gain, the method comprising the following steps:

(1) detecting whether a temperature of said optical storage and retrieving apparatus is greater than a predetermined value;

(2) if the temperature is greater than said predetermined value in step (1), then: lowering value of said braking slope; and (3) repeatedly performing steps (1) to (2), until said optical storage and retrieving apparatus ceases to retrieve data.

11. A temperature control method for an optical storage and retrieving apparatus, said optical storage and retrieving apparatus comprising a carry means selectively rotating at a rate, a servo control means, a guider, a data read/write means moving on said guider at a velocity and a braking slope, said servo control means storing a tracking loop gain, the method comprising the following steps:

(1) detecting whether a temperature of said optical storage and retrieving apparatus is greater than a predetermined value;

(2) if said temperature is greater than said predetermined value in step (1), lowering value of said braking slope and going to step (3), if said temperature is not greater than said predetermined value in step (1), going to step (4), (5), and (6);

(3) repeatedly performing steps (1) to (2), until said optical storage and retrieving apparatus ceases to retrieve data;

(4) setting said rate of said carry means to be a first predetermined value;

(5) setting said velocity to be a second predetermined value and said braking lope to be a third predetermined value; and (6) setting said tracking loop gain to be a fourth predetermined value.

* * * * *